US008429116B2

(12) United States Patent
Chen et al.

(10) Patent No.: US 8,429,116 B2
(45) Date of Patent: Apr. 23, 2013

(54) EFFICIENT UPDATE METHODS FOR LARGE VOLUME DATA UPDATES IN DATA WAREHOUSES

(75) Inventors: Ying Chen, San Jose, CA (US); Bin He, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 671 days.

(21) Appl. No.: 12/131,078

(22) Filed: May 31, 2008

(65) Prior Publication Data
US 2009/0187602 A1 Jul. 23, 2009

Related U.S. Application Data

(63) Continuation of application No. 12/017,511, filed on Jan. 22, 2008, now Pat. No. 8,055,609.

(51) Int. Cl.
*G06F 17/30* (2006.01)

(52) U.S. Cl.
USPC ........... 707/600; 707/640; 707/643; 707/705; 707/713

(58) Field of Classification Search .................. 707/713, 707/643, 640, 600, 705, 999.2
See application file for complete search history.

(56) References Cited

U.S. PATENT DOCUMENTS

| 6,167,405 | A | 12/2000 | Rosensteel, Jr. et al. |
| 6,233,573 | B1 * | 5/2001 | Bair et al. .............................. 1/1 |
| 6,438,538 | B1 | 8/2002 | Goldring |
| 6,438,549 | B1 * | 8/2002 | Aldred et al. ................. 707/640 |
| 6,665,654 | B2 | 12/2003 | Broden et al. |
| 7,739,224 | B1 * | 6/2010 | Weissman et al. ............ 707/794 |
| 2002/0116389 | A1 * | 8/2002 | Chen et al. ................ 707/103 R |
| 2003/0009295 | A1 * | 1/2003 | Markowitz et al. ............. 702/20 |
| 2004/0205727 | A1 * | 10/2004 | Sit et al. ......................... 717/125 |
| 2005/0114398 | A1 * | 5/2005 | Naik et al. .................. 707/104.1 |
| 2005/0261933 | A1 * | 11/2005 | Magnuson ........................ 705/1 |
| 2007/0036076 | A1 | 2/2007 | Boggs |
| 2007/0136330 | A1 * | 6/2007 | Lecheler-Moore et al. .. 707/100 |
| 2007/0239769 | A1 * | 10/2007 | Fazal et al. ..................... 707/102 |
| 2007/0244736 | A1 * | 10/2007 | Johnson ............................ 705/8 |
| 2007/0294208 | A1 * | 12/2007 | Chowdhary et al. ............. 707/1 |
| 2008/0086446 | A1 * | 4/2008 | Zhang et al. ....................... 707/2 |
| 2009/0043730 | A1 * | 2/2009 | Lavdas et al. ..................... 707/2 |

OTHER PUBLICATIONS

Ester et al., "Incremental Clustering for Mining in a Data Warehousing Environment", Proc. of $24^{th}$ VLDB Conf., New York, 1998.
Kotidis et al., "DynaMat: A dynamic View Management System for Data Warehouses", SIGMOD '99 Philadelphia, PA, pp. 371-382.
Riedewald et al., "Efficient Integration and Aggregation of Historical Information", ACM SIGMOD 2002, Jun. 4-6, 2002, pp. 13-24.
Lau et al., "An Integrated Approach to Recovery and High Availability in an Updatable, Distributed Data Warehouse" VLDB '06, Sep. 12-15, Seoul, Korea. pp. 703-714.

* cited by examiner

*Primary Examiner* — Robert Beausoliel, Jr.
*Assistant Examiner* — Noosha Arjomandi
(74) *Attorney, Agent, or Firm* — Cantor Colburn LLP

(57) ABSTRACT

A system and method for ensuring large and frequent updates to a data warehouse. The process leverages a set of temporary staging tables to track the updates. A set of intermediate steps are performed to accomplish bulk deletions of the outdated changed records, and perform modifications to the map tables for models such as snowflake. Finally, bulk load operations load the updates and insert them into the final dimension tables. The process ensures performance comparable to insertion-only schemes with at most only slight performance degradation. Furthermore, a modified process is applied on the newfact data warehouse dimension model. The process can be readily adapted to handle star schema and other hierarchical data warehouse models.

20 Claims, 10 Drawing Sheets

FACT (20)

| RAW_KEY |
|---|
| 1 |
| 2 |

PMKEY (22)

| RAW_KEY | PRI_KEY |
|---|---|
| 1 | AAA |
| 2 | BBB |

DIM1_MAP (24)

| RAW_KEY | TAB_KEY |
|---|---|
| 1 | 1 |
| 1 | 2 |
| 2 | 3 |

DIM1 (26)

| TAB_KEY | ATTR1 |
|---|---|
| 1 | v1 |
| 2 | v2 |
| 3 | v3 |

FIG. 2

RAW_PMKEY (28)

| RAW_KEY | PRI_KEY |
|---|---|
| 3 | CCC |
| 4 | DDD |
| 5 | BBB |
| 6 | EEE |
| 7 | EEE |
| 8 | BBB |

RAW_DIM1 (30)

| RAW_KEY | PRI_KEY | ATTR1 |
|---|---|---|
| 3 | CCC | v1 |
| 5 | BBB | v4 |
| 6 | EEE | v5 |
| 7 | EEE | v6 |
| 8 | BBB | v7 |
| 8 | BBB | v8 |

FIG. 3

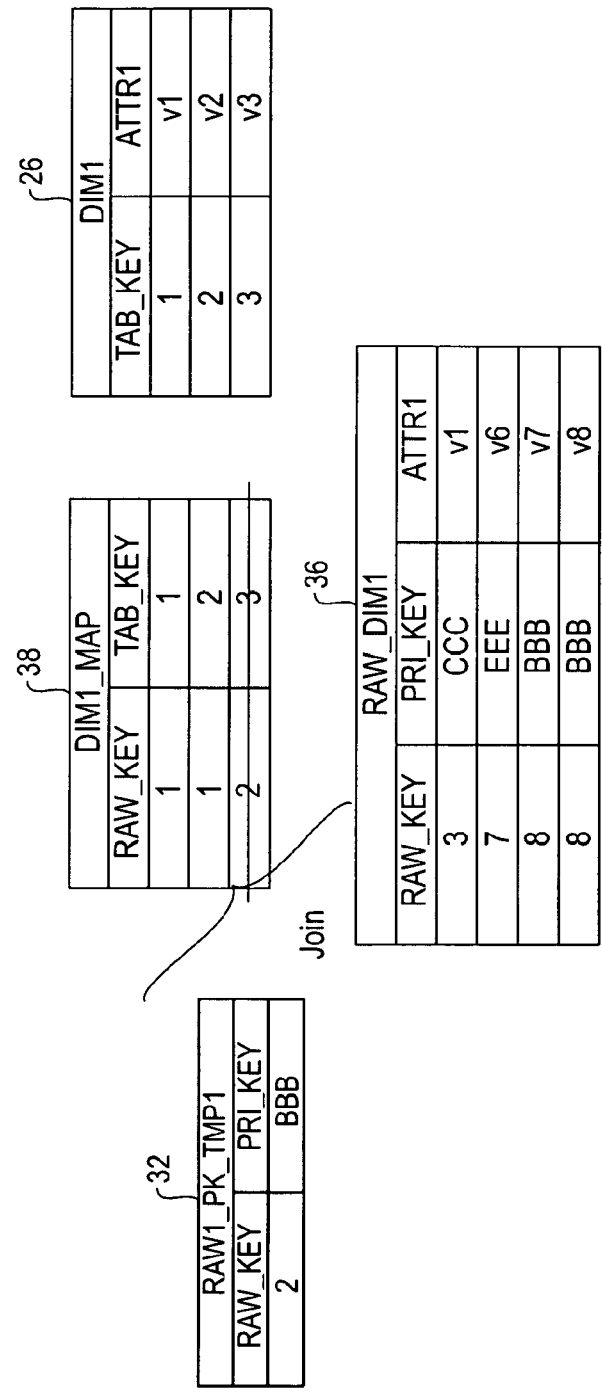

RAW_DIM1 (36)

| RAW_KEY | PRI_KEY | ATTR1 |
|---|---|---|
| 3 | CCC | v1 |
| 7 | EEE | v6 |
| 8 | BBB | v7 |
| 8 | BBB | v8 |

DIM1 (40)

| TAB_KEY | DIM1 | ATTR1 |
|---|---|---|
| 1 | | v1 |
| 2 | | v2 |
| 3 | | v3 |
| 4 | | v6 |
| 5 | | v7 |
| 6 | | v8 |

FIG. 7

RAW_PK_SUM_TMP (42)

| RAW_KEY | PRI_KEY |
|---|---|
| 2 | BBB |
| 3 | CCC |
| 4 | DDD |
| 6 | EEE |

PMKEY (46)

| RAW_KEY | PRI_KEY |
|---|---|
| 1 | AAA |
| 2 | BBB |
| 3 | CCC |
| 4 | DDD |
| 6 | EEE |

FACT (48)

| RAW_KEY |
|---|
| 1 |
| 2 |
| 3 |
| 4 |
| 6 |

DIM1_MAP (50)

| RAW_KEY | TAB_KEY |
|---|---|
| 1 | 1 |
| 1 | 2 |
| 2 | 5 |
| 2 | 6 |
| 3 | 1 |
| 6 | 4 |

DIM1 (52)

| TAB_KEY | ATTR1 |
|---|---|
| 1 | v1 |
| 2 | v2 |
| 4 | v6 |
| 5 | v7 |
| 6 | v8 |

FIG. 11

PMKEY (54)

| RAW_KEY | PRI_KEY |
|---|---|
| 1 | AAA |
| 2 | BBB |

FACT (56)

| RAW_KEY |
|---|
| 1 |
| 2 |

DIM2 (58)

| RAW_KEY | ATTR2 |
|---|---|
| 1 | u1 |
| 2 | u2 |
| 2 | u3 |

| RAW_DIM1 | |
|---|---|
| RAW_KEY | PRI_KEY |
| 3 | CCC |
| 4 | DDD |
| 5 | BBB |
| 6 | EEE |
| 7 | EEE |
| 8 | BBB |

| RAW_DIM2 | | |
|---|---|---|
| RAW_KEY | PRI_KEY | ATTR1 |
| 3 | CCC | u3 |
| 4 | DDD | u2 |
| 6 | EEE | u4 |
| 7 | EEE | u5 |
| 7 | EEE | u6 |
| 8 | BBB | u7 |

FIG. 12

| RAW_PK_TMP1 | |
|---|---|
| RAW_KEY | PRI_KEY |
| 2 | BBB |

| DIM2 | |
|---|---|
| RAW_KEY | ATTR2 |
| 1 | u1 |
| ~~2~~ | ~~u2~~ |
| ~~2~~ | ~~u3~~ |

Join

| RAW_DIM2 | | |
|---|---|---|
| RAW_KEY | PRI_KEY | ATTR1 |
| 3 | CCC | u3 |
| 4 | DDD | u2 |
| 7 | EEE | u5 |
| 7 | EEE | u6 |
| 8 | BBB | u7 |

FIG. 13

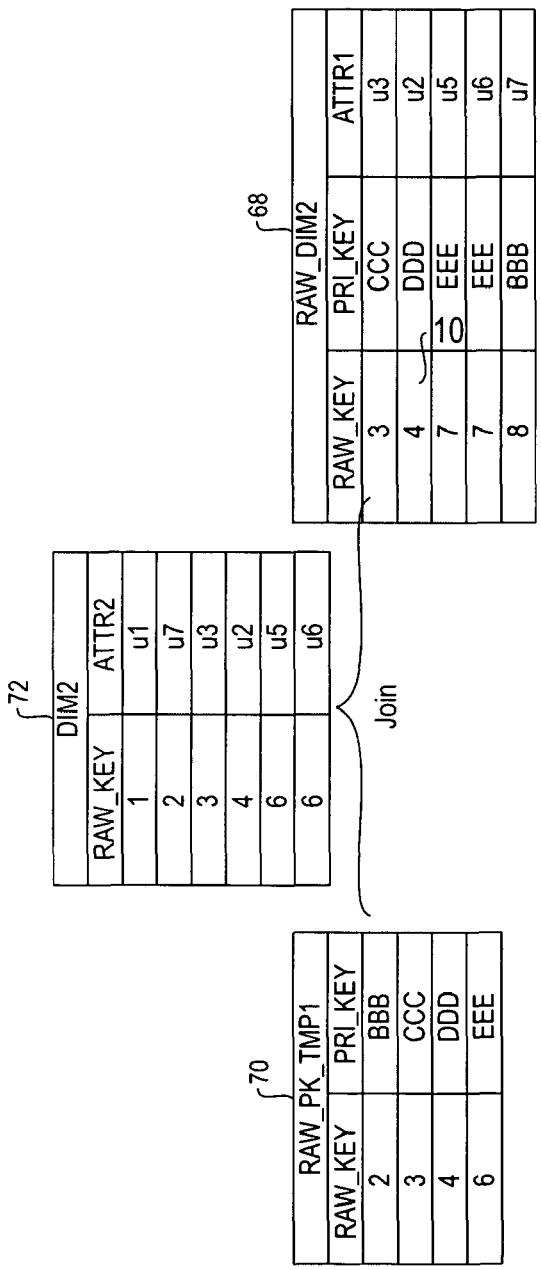

EFFICIENT UPDATE METHODS FOR LARGE VOLUME DATA UPDATES IN DATA WAREHOUSES

RELATED APPLICATIONS

This application is a continuation application of and claims priority to application Ser. No. 12/017,511, filed Jan. 22, 2008, which is currently pending, and which is hereby incorporated by reference in its entirety as if fully set forth.

FIELD OF INVENTION

The present invention generally relates to data warehouses, and particularly to systems and methods for efficient update of large volume data updates in data warehouses.

BACKGROUND

Data warehouses are databases specially designed to support enterprise management information and analysis purposes. Enterprises are building increasingly larger data warehouses to enable analytics as a way to unlock the power of information and improve business performance. For instance, many call centers have deployed data warehousing and analytics solutions to identify hot issues and new self-service opportunities. Often, call center tickets are constantly being collected, ingested and processed into the data warehouses, to enable analytics. Throughout this data flow, some tickets may be updated, based on their status changes, e.g., from "open" ticket to "closed", while others might simply be inserted as newly created tickets. However, current data warehousing technologies have significant drawbacks to support such data flows effectively.

For example, existing data warehousing technologies may not have native support for large volume updates into the data warehouse that are performed on a regular basis. Typically, database warehouse users must manually update changed records via low-level relational database management system (RDBMS) operations. Manual updates may work adequately if they are only occasional and the updates involve small amounts of data. For frequent updates of large amounts of data, manual updates may not work. A current solution is to refresh the entire data warehouse whenever large amount of updates need to be ingested. Clearly, this is not efficient when the update stream is large and incrementally growing, because every time, all the data must be reloaded from the very beginning.

Accordingly, there is a need for a system and method for efficiently performing large volume updates of data warehouses on a regular basis. There is also a need for a system and method of updating data warehouses that does not require the data warehouse to be rebuilt and refreshed from scratch.

SUMMARY OF THE INVENTION

To overcome the limitations in the prior art briefly described above, the present invention provides a method, computer program product, and system for updating data warehouses which is efficient and can perform frequent and large volume data updates.

In one embodiment of the present invention a method for updating a data warehouse comprises: identifying a primary key for each fact entry in a data warehouse having a fact table and a set of dimensions each of which corresponds to a predetermined schema; for each dimension, batch deleting those records subject to an update, based on the primary key; for each dimension, bulk loading new records into its corresponding dimension table, based on the primary key; and bulk loading the new records into the fact table, based on the primary key.

In another embodiment of the present invention, a method for use with a data warehouse comprises: finding a next raw_key to use in a fact table; bulk loading updated records into a raw table which serves as a temporary table; finding existing and new records in a primary key dimension; for each dimension in the data warehouse, except the primary key dimension, finding up-to-date records in the raw table, batch deleting all records that need to be changed from a map table and bulk loading new records into that dimension table; finding all records to be loaded with correct raw_keys; for each dimension in the data warehouse, except the primary key dimension, batch loading into the map table and batch deleting all non-linked records from the dimension table; and populating the fact table and primary key dimension.

In a further embodiment of the present invention a method comprises: finding a next raw_key to use in a fact table in a database having a fact table and a set of dimensions each of which corresponds to a predetermined schema; bulk loading the updated records into a raw table which serves as a temporary table; finding existing and new records in a given set of records to be updated and/or inserted as new records; for each dimension in the data warehouse, except the primary key dimension table, finding up-to-date records in the raw table, batch deleting all records that need to be changed from the dimension table, finding all records to load with correct raw keys and batch inserting the found records into the dimension table; and populating the fact table and primary key dimension.

In another embodiment of the present invention, a computer program product comprises a computer usable medium having a computer readable program, wherein the computer readable program when executed on a computer causes the computer to: identify a primary key for each fact entry in a data warehouse having a fact table and a set of dimensions each of which corresponds to a predetermined schema; for each dimension, batch delete those records subject to an update, based on the primary key; for each dimension, bulk load new records into its corresponding dimension table, based on the primary key; and bulk load the new records into the fact table, based on the primary key.

Various advantages and features of novelty, which characterize the present invention, are pointed out with particularity in the claims annexed hereto and form a part hereof. However, for a better understanding of the invention and its advantages, reference should be made to the accompanying descriptive matter together with the corresponding drawings which form a further part hereof, in which there are described and illustrated specific examples in accordance with the present invention.

BRIEF DESCRIPTION OF THE DRAWINGS

The present invention is described in conjunction with the appended drawings, where like reference numbers denote the same element throughout the set of drawings:

FIG. 2 shows an update method for the snowflake data model using one dimension, in accordance with an embodiment of the invention;

FIG. 3 shows raw tables created for inserts and updates for different tables in a data warehouse, in accordance with an embodiment of the invention;

FIG. 5 shows the deletion of obsolete records in a table, in accordance with an embodiment of the invention;

FIG. 6 shows the deletion of updated records from a dimension map table, in accordance with an embodiment of the invention;

FIG. 7 shows the bulk insert of new values into a dimension table, in accordance with an embodiment of the invention;

FIG. 8 shows a map table correction process, in accordance with an embodiment of the invention;

FIG. 10 shows the final table contents after updates and inserts, in accordance with an embodiment of the invention;

FIG. 11 shows a NEWFACT data model in a data warehouse, in accordance with an embodiment of the invention;

FIG. 12 shows RAW table contents, in accordance with an embodiment of the invention;

FIG. 13 shows the deletion of changed records, in accordance with an embodiment of the invention;

FIG. 14 shows the population of a table via a join, in accordance with an embodiment of the invention;

FIG. 15 shows final states of data warehouse tables after updates and inserts, in accordance with an embodiment of the invention.

DETAILED DESCRIPTION OF THE INVENTION

The present invention overcomes the problems associated with the prior art by teaching a system, computer program product, and method for efficient regular large volume data updates in data warehouses. One example application for the present invention is in the call centers. In the following detailed description, numerous specific details are set forth in order to provide a thorough understanding of the present invention. Those skilled in the art will recognize, however, that the teachings contained herein may be applied to other embodiments and that the present invention may be practiced apart from these specific details. Accordingly, the present invention should not be limited to the embodiments shown, but is to be accorded the widest scope consistent with the principles and features described and claimed herein. The following description is presented to enable one of ordinary skill in the art to make and use the present invention and is provided in the context of a patent application and its requirements.

The invention addresses problems that may arise when performing large volume data updates in data warehouses. The present invention provides an efficient update mechanism embedded in an extract transform load (ETL) engine which ensures fast loading of data into data warehouses even in the face of voluminous and frequent updates. Also, the present invention can enable fast updates across different and yet common data warehouse models and schemas.

The present invention has significant advantages over the state of the art in that it provides a set of temporary staging tables to track updates, which results in efficient updates of large volume data updates. Prior art systems relied on manually updating records using low-level RDBMS operations or refreshed the entire data warehouse. This is impractical in large volume, regular updates. Prior systems did not provide a set of temporary staging tables to track updates.

Figure 1:
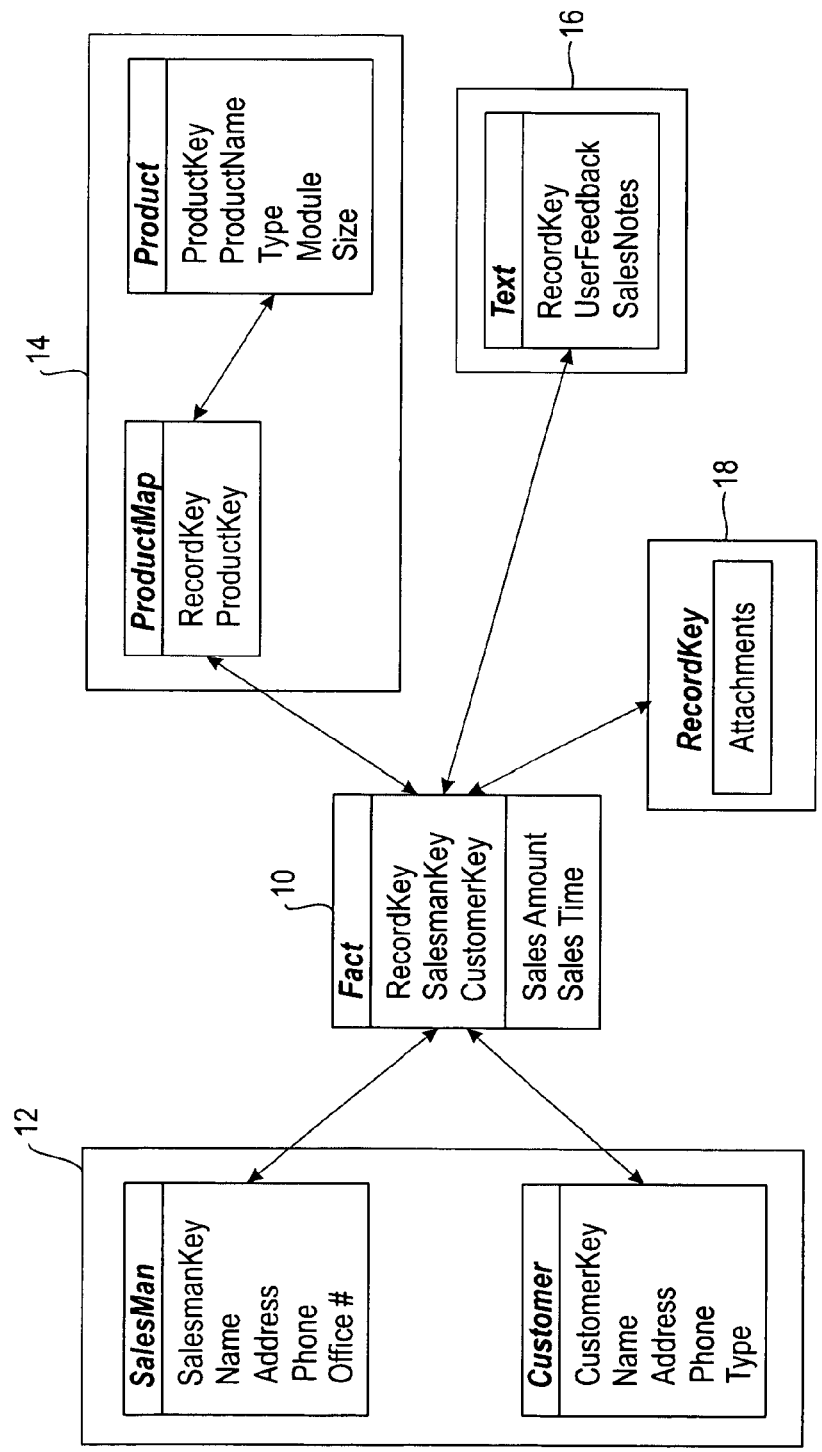
FIG. 1 shows a block diagram of different data warehouse data models and schemas which may be used with embodiments of the invention.

In general, typical data warehousing engines, such as DB2 Data Warehouse Edition, ASCENTIAL DataStorage, or INFORMATICA, support different data warehouse schemas/data models, such as "measures", "facts", "star schema", "snowflake schema". FIG. 1 shows some examples of common data warehouse models/schemas, such as "measures" 10, "star schema" 12, "snowflake schema" 14, "new fact" 16 and "file" 18. Different models are often used for different purposes and have different tradeoffs in terms of performance, flexibility, scalability, and storage utilization. For example, "snowflake" schema 14 works well to reduce the storage space utilization by leveraging an intermediate map table to coalesce duplicate values for dimension tables. A "newfact" schema 16, however, typically is designed for high-speed data loading by sacrificing on the disk storage utilization, since some of the dimension values may be duplicated under the "newfact" model.

To support fast updates, embodiments of the present invention may assume the following:

1. The data warehouse records have primary keys. For instance, the call center problem tickets must have a ticket number or other identifier to uniquely identify a given ticket. Updates to a given ticket will use the primary key in order to locate a record in the data warehouse.
2. The new records to be inserted into the data warehouse must have new/unique primary keys, e.g., problem ticket numbers.
3. Since each conceptual record in the data warehouse, e.g., a call center problem ticket, might have multiple attributes, e.g., ticket number, status, opening and closing times and dates, call logs in text formats, etc., and such attributes might be grouped into different dimension tables in the data warehouse, the present invention allows updates to individual dimensions to be done collectively or independently. However, updates must be done on the entire dimension. That is, updates to the individual attributes in a given dimension are not supported, since additional knowledge is needed to locate the attributes in a dimension. This is not a significant restriction since most of the dimensions are designed to represent some logical grouping of attributes that tend to be updated or retrieved together. For instance, a name dimension may have "first name" and "last name" as attributes, and the updates to the name dimension are for the entire names normally. This restriction can be alleviated by designing the right dimension layouts in the data warehouse. In certain cases, each dimension may only have one attribute. In such cases, users can choose to update any attributes independently. However, such a schema design may not work well when it comes to query performance, as additional RDBMS table joins might be needed to retrieve required information.

At a high level, the main inhibitor to the efficient updates in existing data warehousing solutions is that updates are typically not done through RDBMS's bulk loading facility. Instead, individual table updates are typically carried out, which requires large amount of expensive joins among different tables. RDBMS bulking loading allows a large amount of data to be loaded at once, and hence significantly improve the data loading performance. It is typically used for bulk new data insertions in existing warehousing solutions. However, leveraging RDBMS bulk loading for the update scenario is not straight-forward. Simply bulk loading data into the warehouse would result in multiple versions records in the same warehouse and hence confuse the end applications that utilize the warehouse content.

The present invention includes an update method that utilizes the RDBMS bulk-loading facility to ensure the high speed data loading even in the face of frequent and large volume updates. To illustrate the update methods of the invention, two example data warehouse schemas are used. The methods can be easily modified and adopted to handle other data warehouse models, and hence should not be regarded as limiting. Broadly, the invention utilizes the following primary elements:

1. A set of temporary staging tables, called "raw tables", to stage the updates that can be bulk-loaded into the final data warehouse tables;
2. An algorithm that identifies the to-be-updated records in the existing data warehouse tables and deletes them; and
3. A bulk load step that bulk loads the updates into the appropriate dimension and fact tables.

Embodiments are described below illustrating the application of the principles of the invention to two different data warehouse schemas, the snowflake and the new fact models. It will be appreciated that the invention may also be applied to other data warehouse schemas besides these two examples.

An update method for the snowflake schema is described below and illustrated in FIGS. 2-10. Under the snowflake schema, a FACT table is created which contains the reference for each of the records in the data warehouse. For example, with reference to FIG. 2, each call center problem ticket will have a row in a FACT table 20. There is also a primary key table 22, labeled PMKEY in FIG. 2. The PMKEY table 22 contains two attributes, i.e., raw_key and pri_key, which serves as the primary key for the records. In the call center example, the primary_key may be the problem ticket number, which uniquely identifies the problem ticket in the warehouse. Raw_key is internally generated by the data warehouse engine. The FACT table has at least one attribute, i.e., raw_key. Raw_key in the FACT table 20 and in the PMKEY table 22 are the same.

FIG. 2 also shows a map table 24, labeled DIM1_MAP, and a dimension table 26, labeled DIM1. Raw_key serves as a foreign key to link between the FACT table 20 records and the dimension table 26 records, as well as PMKEY table 22 records. The map table 24 is needed under the snowflake schema for each dimension table. The map table 24 contains at least two attributes, i.e., RAW_KEY and TAB_KEY. RAW_KEY is the foreign key to link between FACT tables 20 and Map tables 24. TAB_KEY links the MAP table 24 records and the Dimension table 26 records, as shown in FIG. 2. The dimension table 26 contains at least two attributes, i.e., TAB_KEY and ATTR1. In this example, problem ticket AAA has two values for dimension table 26 ATTR1, v1 and v2. Problem ticket BBB only has one value for dimension table 26 ATTR, v3.

Under this schema, the bulk-update method of this embodiment of the invention follows the following algorithm:

For a given set of records to be updated and/or inserted as new records (denoted as R for the set):

1. Find the next raw_key to use in the FACT table
2. Bulk load the updated records into a raw table which serves as a temporary table
3. Find existing and new records in R
4. For each dimension in the data warehouse, except the primary key dimension/table, which only contains attributes forming the primary key:
    a. Find up-to-date records in the raw table
    b. Batch delete all records that need to be changed from the map table
    c. Bulk load new records into that dimension table
    d. Find all records to load with correct raw_keys
5. For each dimension, except the primary key dimension/table
    a. Bulk load into the map table
    b. Batch delete all non-linked records from the dimension table
6. Populate the fact table and primary key dimension The first step, i.e., "Find the next raw_key to use in the FACT table", allows the data warehouse engine to generate the appropriate raw_key for the updated records or the new records to be inserted. Following the example in FIG. 2 above, the next raw_key would need to start from 3 for the new batch of records to be processed into the warehouse. Once the next starting raw_key is generated, this embodiment utilizes a set of temporary RAW tables to allow all of the records in R to be bulk loaded into the data warehouse, as opposed to one at a time, which can be extremely slow.

FIG. 3 shows an example of step 2 using some sample records. In this example, it is assumed that records contains updates and inserts for records "CCC, DDD, BBB, and EEE". There is one RAW table created from the PMKEY table, called RAW_PMKEY 30, and one RAW table created for each dimension table, such as RAW_DIM1 32 for the DIM1 table. The records are bulk-loaded into the appropriate RAW tables as if they were any new records to be inserted. FIG. 3 shows that DIM1 has a set of updates and inserts on tickets CCC, BBB, and EEE. Notice that DDD does not show up in RAW_DIM1 32. This is because the update/inserts of DDD may only affect only a subset of dimension tables, which may not include DIM1.

Figure 4:
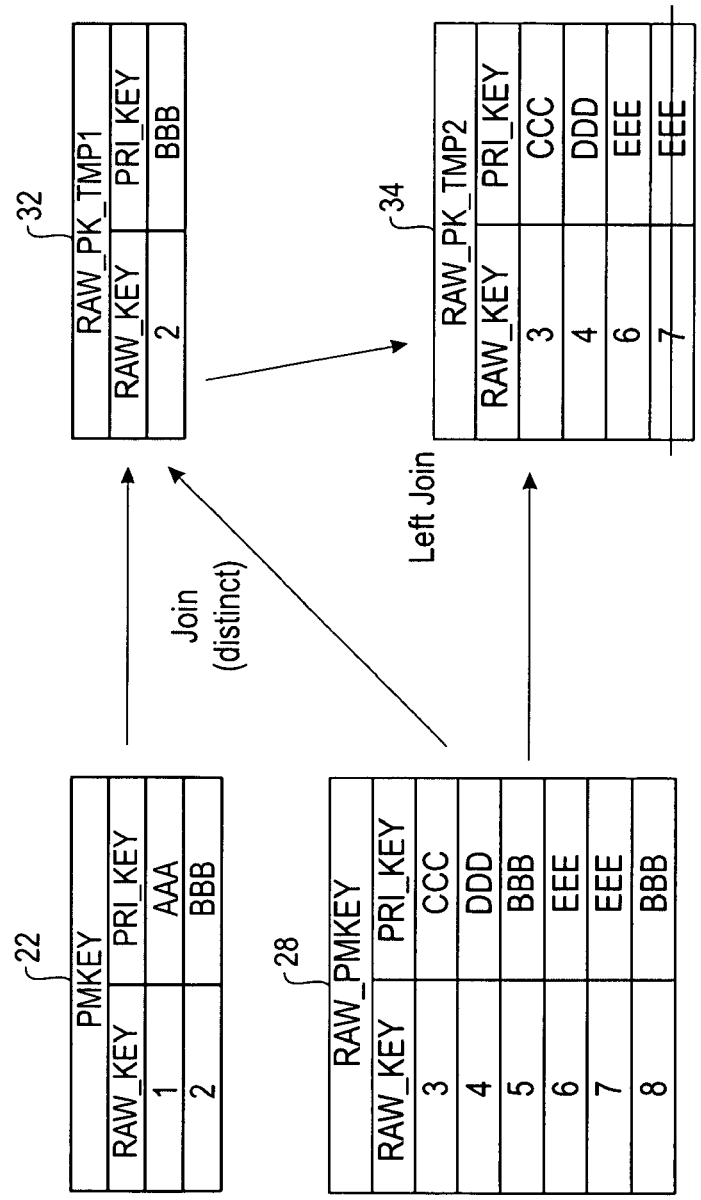
FIG. 4 shows table joins needed to identify records to be inserted and updated, in accordance with an embodiment of the present invention.

Once the records in R are bulk-loaded into different dimension tables and the RAW_PMKEY table 28, the next step (step 3 above) is to identify which records in R are meant for updates of existing records in the data warehouse and which ones are meant for new inserts, e.g., newly created tickets. This can be easily done by a few joins, as illustrated in FIG. 4. A join between the RAW_PMKEY table 28 and the existing PMKEY table 22 will distinguish which records were to be updated and which ones were to be inserted. As discussed above, the RAW_PMKEY 28 table contains all the records in R. As shown in FIG. 4, such a join results in two temporary tables, i.e., RAW_PK_TMP1 32 and RAW_PK_TMP2 34. RAW_PK_TMP1 32 contains the records that are to be updated, and RAW_PK_TMP2 34 contains the unique records to be inserted. Notice also that we do not have to keep the duplicate records in the TAW_PK_TMP tables because they are mainly used to track the unique records to be inserted and updated. As a result, the duplicate EEE record was collapsed into one record in RAW_PK_TMP2 34, as shown in FIG. 4.

Following step 3 is a repeated sequence of steps for handling each dimension table updates and inserts, steps 4a-4d above. We use DIM1 as an example to illustrate the steps taken for each dimension. For DIM1, we first find the up-to-date records in that table by deleting the duplicates from RAW_DIM1 30, resulting in revised RAW_DIM1 table 36, as shown in FIG. 5. For example, BBB is updated as according to RAW_KEY 5 as well as RAW_KEY 8. This means that the value for <BBB, RAW_KEY 5> can be eliminated because it will be updated again by <BBB, RAW_KEY 8> since subsequent changes will make the change in RAW_KEY 5 obsolete. Updates to EEE are handled similarly. In here, all records with the same RAW_KEY are collectively considered as the values for the attribute, e.g., ATTR1. For instance, ATTR1 could be agent names. Each ticket may have multiple agents who are working on it. So V7 and V8 may mean that there are two agents who are working on the same ticket, which in the past, there were only one agent who was handling the ticket.

Referring now to FIG. 6, after the RAW_DIM1 table 36 is cleaned up, the process according to the embodiment will find the records in the map table for DIM1 that need to be updated and delete them accordingly. This is done by performing a join between the RAW_PK_TMP1 table 32 and the updated RAW_DIM1 table 36 based on the PRI_KEY value. For instance, in FIG. 6, such a join will indicate that BBB is to be updated, and its RAW_KEY is 2. Then the process will delete the row with RAW_KEY value 2 from the DIM1_MAP table 24, since that record is to be updated, resulting in updated map table 38. Note that we could have also then deleted the updated attribute value based on the TAB_KEY value 3, i.e., V3 from the DIM1 table 26. But we do not at this time because V3 should also be shared with other TAB_KEYs in the DIM1_MAP table 24. We defer the deletion of the attribute values from the dimension tables in the end.

As shown in FIG. 7, once the map table is cleaned up, the process bulk-loads the records in the raw table, e.g., revised RAW_DIM1 36, into the dimension table, e.g., DIM1 26, resulting in a revised dimension table DIM1 40. Note that the TAB_KEYs are internally generated, that they are increasing only, and that only new values are inserted in the dimension table. v1 is not inserted because it's already in revised DIM1 40. Steps 4a-d are now complete.

The above steps handle the updates and insertions of records in R for a dimension, e.g., DIM1. But the map table for the dimension table has not been correctly set up. To correct the map table, the following steps (steps 5a-b) are needed: First, remember that the sum of RAW_PK_TMP1 32 and RAW_PK_TMP2 34 tables provides all of records in the data warehouse that should be updated and inserted. In the example we have been following above, the sum of the two tables, RAW_PK_SUM_TMS 42, is as shown in FIG. 8. Table RAW_PK_SUM_TMS 42 contains four unique primary keys, with appropriate RAW_KEY values.

Figure 9:
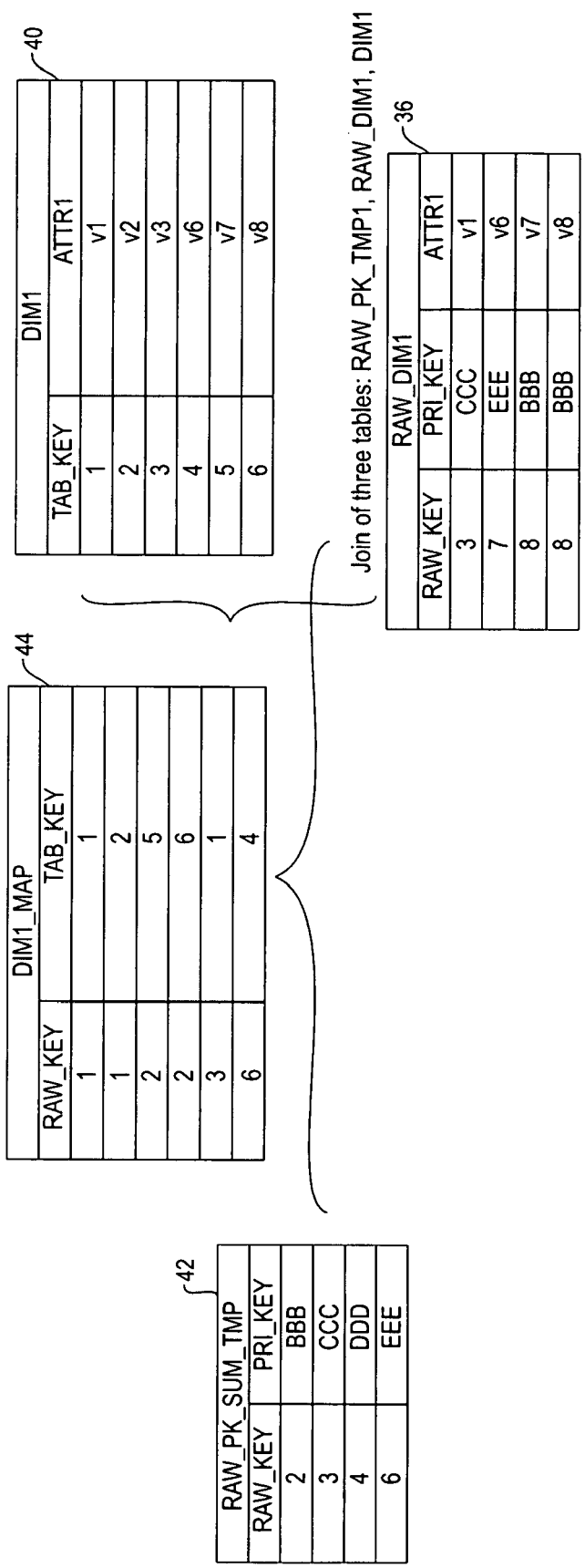
FIG. 9 shows a process for populating a map table, in accordance with an embodiment of the invention.

To correct the map table for a given dimension, a set of joins must occur as shown in FIG. 9. First, in order to identify the right pairing between the RAW_KEY and TAB_KEY for the map table, we need to join the RAW_PK_SUM_TMP table 42 and the RAW_DIM1 table 36 to find the RAW_KEYs that need to be inserted into the map table through the PRI_KEY values. The RAW_PK_SUM_TMP table 42 contains the correct RAW_KEY values while the RAW DIM1 table 36 contains only temporary RAW_KEY values. The join of these two tables will result in changing of the RAW_KEY values for the RAW_DIM1 table 36 into 3, 6, 2, and 2 in that order from top down. Then the join between the updated RAW_DIM1 table and the revised DIM1 table 40 based in the attribute values will provide the correct TAB_KEY values as shown in the final DIM1_MAP table 44 in FIG. 9.

After the above step, we have the final map table for the dimension, e.g., DIM1. But the dimension table, e.g., DIM1, may still contain the dangling records because some of its map table entries have been deleted in the earlier step. For example v3 is the dangling record that is not associated with any records with a primary key. This is because v3 was associated with BBB. But BBB was updated to V7, V8. So the next step (step 5b), is to finalize the sets of tables for DIM1 by removing all the dangling records in the table. Note also that there is no particular harm in keeping such dangling records in the dimension tables for a while, since the runtime query may not find it through primary_keys. Even if a roll-up calculation is done, the results will just show 0 count for the dangling values, e.g., v3. A trivial performance optimization could be to delay the last step of cleaning the dangling rows in the dimension tables as an offline and background process, instead of inlining with the update operation. For instance, one can clean the dangling rows once every day from the dimension tables.

The last step, step 6, of the entire update procedure is to populate the FACT table and the primary_key table. This can be easily done by adding the new RAW_KEYs from the RAW_PK_TMP2 table 34 to the FACT table 20 and the PMKEY table 22. The final state of all of the tables after all above steps is shown in FIG. 10. We have an updated PMKEY table 46, updated FACT tables 48, and for each dimension, we have updated map tables 50 and the updated dimension tables 52, accordingly.

It will be appreciated that, with the above-described embodiment, the individual updates can be handled with several large table bulk-loads. The performance of loading and using this process is significantly improved over previous techniques.

An update method for the newfact schema is described below and shown in FIGS. 11-15. Note that under the snowflake schema, the most time-consuming operations come from step 5 where the map table is being updated. This was shown in FIG. 9, as well. Such operations may not be needed under a different data warehouse schema, e.g., newfact model. Under the newfact schema, the map table is removed from the picture. Each dimension table maps directly to the FACT table via RAW_KEYs, as shown in FIG. 11. Without the intermediate map table, the dimension table may contain duplicate values for different records. Hence the storage utilization for the newfact model may be less efficient than snowflake. On the other hand, the simplicity of newfact makes is much easier to perform updates and inserts. The following is a process for updates on the newfact model in accordance with an embodiment of the invention:

1. Find the next raw_key to use in the FACT table
2. Bulk load the updated records into a raw table which serves as a temporary table
3. Find existing and new records in R
4. For each dimension in the data warehouse, except the primary key dimension/table
   a. Find up-to-date records in the raw table
   b. Batch delete all records that need to be changed from the dimension table
   c. Find all records to load with correct raw_keys
   d. Batch insert records into the dimension table
5. Populate the fact table and primary key dimension It can be seen that, the majority of the steps are similar to the snowflake schema. We will use a different dimension, DIM2, as an example to illustrate how the algorithm works. Let us assume that we start the example from FIG. 2. But this time, we have one additional dimension that is structured in the newfact model, DIM2. The table states in the data warehouse including DIM2 are shown in FIG. 11. In particular, FIG. 11 shows a PMKEY table 54, a fact table 56 and a dimension table 58. We assume that we have done Step 1 above to identify that the new RAW_KEY to start is 3, which is the same as what was done for the DIM1 example discussed above. In step 2, the process will do a bulk-load to load new records that are specific to DIM2 into RAW_DIM2, as shown in FIG. 12. In particular, FIG. 12 shows a RAW_PMKEY table 60 and a RAW_DIM2 table 62. As shown in FIG. 12, this step will update a record for BBB in DIM2 and add new records for CCC, DDD, and EEE.

Step 3 is the same as shown in FIG. 4, which identifies the records to be updated and the records to be inserted. In this case, BBB is to be updated, and others are to be inserted. For the RAW_DIM2 table 62, the duplicate records are deleted as well, just as in the case of the snowflake dimension DIM1 (as shown in FIG. 5). For RAW_DIM2, <RAW_KEY 6, EEE> is made obsolete by <RAW_KEY 7, EEE> since u4 will be subsequently updated by u5 and u6.

The process next performs steps 4a-d, which removes all the records to be changed from the dimension table, DIM2, as shown in FIG. 13. To identify the to-be-changed records in the DIM2 table, a join operation is needed between a RAW_KEY_TMP1 table 66 and a RAW_DIM2 table 68. In this case, records associated with RAW_KEY 2 are deleted from DIM2 table, resulting in a revised DIM2 table 64, which is step 4b.

Step 4c is the same as shown in FIG. 8, which identifies all of records in the data warehouse that should be updated and inserted. It contains four unique primary keys, with appropriate RAW_KEY values. Finally, in step 4d, the DIM2 table 64 is bulk-loaded by joining the RAW_PK_TMP1 table 70 and the RAW_DIM2 table 68 to identify the correct RAW_KEY and attribute value pairs. This yields revised DIM2 table 72, as shown in FIG. 14. The final table state including DIM1 (in snowflake model) is shown in FIG. 15, which shows the PMKEY table 74, the FACT table 76, the DIM1_MAP table 78, the DIM1 table 80 and the DIM2 table 81.

It can be seen that the operations required for the newfact model are much simpler than with the snowflake model. Under the newfact model, no operations are needed to update the map table, which involves expensive joins among several tables. These operations are especially expensive if the dimension table is large. Under the newfact model, none of such large joins are required. On the other hand, the newfact table may replicate attribute values multiple times and hence take up more disk space than the snowflake model.

As disclosed herein, the present invention provides a process for ensuring large and frequent updates to data warehouse. The process leverages a set of temporary staging tables to track the updates. Intermediate steps are performed to bulk delete the outdated changed records and modifications to the map tables are combined for models such as snowflake. Finally, a set of bulk load operations loads the updates and inserts them into the final dimension tables. The algorithm ensures comparable performance when compared to insertion-only schemes with slight performance degradation. Furthermore, a modified process is applied on the newfact data warehouse dimension model. It will be appreciated that this process can be readily adapted to handle star schema and other hierarchical data warehouse models.

The invention can take the form of an entirely hardware embodiment, an entirely software embodiment or an embodiment containing both hardware and software elements. In a preferred embodiment, the invention is implemented in software which includes, but is not limited to, firmware, resident software and microcode.

Furthermore, the invention can take the form of a computer program product accessible from a computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

The medium can be an electronic, magnetic, optical, electromagnetic, infrared, semiconductor system (or apparatus or device), or a propagation medium. Examples of a computer-readable medium include a semiconductor or solid state memory, magnetic tape, a removable computer diskette, a random access memory (RAM), a read-only memory (ROM), a rigid magnetic disk, or an optical disk. Current examples of optical disks include compact disk-read-only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices) can be coupled to the system either directly or through intervening I/O controllers.

Network adapters may also be coupled to the system to enable the data processing system to become coupled to other data processing systems or remote printers or storage devices through intervening private or public networks. Modems, cable modems and Ethernet cards are just a few of the currently available types of network adapters.

Figure 16:
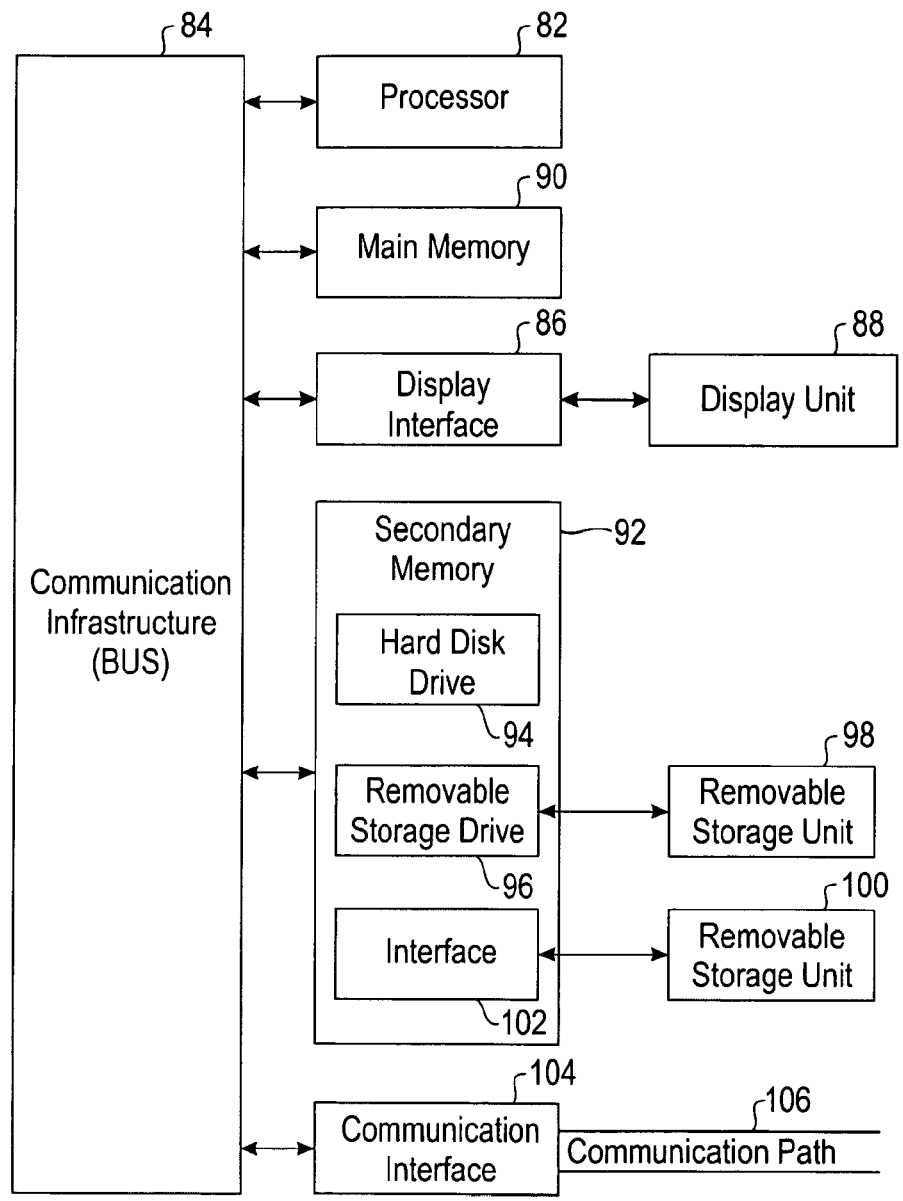
FIG. 16 is a high level block diagram showing an information processing system useful for implementing one embodiment of the present invention.

FIG. 16 is a high level block diagram showing an information processing system useful for implementing one embodiment of the present invention. The computer system includes one or more processors, such as processor 82. The processor 82 is connected to a communication infrastructure 84 (e.g., a communications bus, cross-over bar, or network). Various software embodiments are described in terms of this exemplary computer system. After reading this description, it will become apparent to a person of ordinary skill in the relevant art(s) how to implement the invention using other computer systems and/or computer architectures.

The computer system can include a display interface 86 that forwards graphics, text, and other data from the communication infrastructure 84 (or from a frame buffer not shown) for display on a display unit 88. The computer system also includes a main memory 90, preferably random access memory (RAM), and may also include a secondary memory 92. The secondary memory 92 may include, for example, a hard disk drive 94 and/or a removable storage drive 96, representing, for example, a floppy disk drive, a magnetic tape drive, or an optical disk drive. The removable storage drive 96 reads from and/or writes to a removable storage unit 98 in a manner well known to those having ordinary skill in the art. Removable storage unit 96 represents, for example, a floppy disk, a compact disc, magnetic tape, or optical disk, which is read by and written to by removable storage drive 96. As will be appreciated, the removable storage unit 98 includes a computer readable medium having stored therein computer software and/or data.

In alternative embodiments, the secondary memory 92 may include other similar means for allowing computer programs or other instructions to be loaded into the computer system. Such means may include, for example, a removable storage unit 100 and an interface 102. Examples of such may include a program cartridge and cartridge interface (such as that found in video game devices), a removable memory chip (such as an EPROM, or PROM) and associated socket, and other removable storage units 100 and interfaces 102 which allow software and data to be transferred from the removable storage unit 100 to the computer system.

The computer system may also include a communications interface 104. Communications interface 104 allows software and data to be transferred between the computer system and external devices. Examples of communications interface 104 may include a modem, a network interface (such as an Ethernet card), a communications port, or a PCMCIA slot and card. Software and data transferred via communications interface 104 are in the form of signals which may be, for example, electronic, electromagnetic, optical, or other signals capable of being received by communications interface 104. These signals are provided to communications interface 104 via a communications path (i.e., channel) 106. This channel 106 carries signals and may be implemented using wire or cable, fiber optics, a phone line, a cellular phone link, an RF link, and/or other communications channels.

In this document, the terms "computer program medium," "computer usable medium," and "computer readable medium" are used to generally refer to media such as main memory 90 and secondary memory 92, removable storage drive 96 and a hard disk installed in hard disk drive 94.

Computer programs (also called computer control logic) are stored in main memory 90 and/or secondary memory 92. Computer programs may also be received via communications interface 104. Such computer programs, when executed, enable the computer system to perform the features of the present invention as discussed herein. In particular, the computer programs, when executed, enable the processor 82 to perform the features of the computer system. Accordingly, such computer programs represent controllers of the computer system.

In accordance with the present invention, we have disclosed systems and methods for configuring database drivers which is global, dynamic, remote and centralized. It also provides a way for applications to automatically configure the database drivers across multiple locations.

References in the claims to an element in the singular is not intended to mean "one and only" unless explicitly so stated, but rather "one or more." All structural and functional equivalents to the elements of the above-described exemplary embodiment that are currently known or later come to be known to those of ordinary skill in the art are intended to be encompassed by the present claims. No claim element herein is to be construed under the provisions of 35 U.S.C. section 112, sixth paragraph, unless the element is expressly recited using the phrase "means for" or "step for."

While the preferred embodiments of the present invention have been described in detail, it will be understood that modifications and adaptations to the embodiments shown may occur to one of ordinary skill in the art without departing from the scope of the present invention as set forth in the following claims. Thus, the scope of this invention is to be construed according to the appended claims and not limited by the specific details disclosed in the exemplary embodiments.

We claim:

1. A method for updating a data warehouse comprising:
    identifying a primary key for each fact entry in a data warehouse having a fact table and a set of dimensions, each of said dimensions corresponding to a predetermined schema;
    for each fact entry in the data warehouse, linking the fact table and the set of dimensions;
    for each said dimension, batch deleting those records from its corresponding dimension table subject to an update, based on said primary key, including removing any dangling records from the corresponding dimension table, thereby updating the corresponding dimension table and removing any dangling values not associated with the corresponding dimension;
    for each said dimension, bulk loading new records into its corresponding dimension table, based on said primary key; and
    bulk loading said new records into said fact table, based on said primary key,
    wherein the bulk loading is via a temporary table, which stages updated records to be at least one of inserted and bulk-loaded to final data warehouse tables, and preventing duplicate records.

2. The method of claim 1 wherein said predetermined schema is the snowflake schema.

3. The method of claim 1 wherein said predetermined schema is the newfact schema.

4. The method of claim 1 wherein said predetermined schema is selected from the group of schemas consisting of: measures, facts and star.

5. The method of claim 1 wherein said data warehouse includes call center data.

6. The method of claim 5 wherein said primary keys are problem ticket identifiers.

7. The method of claim 1 wherein said bulk loading comprises relational database management system bulk loading.

8. The method of claim 1 wherein said dimension table comprises a set of attributes.

9. The method of claim 8 wherein said set of attributes includes at least one of the following attributes: agent, status, opening and closing times, opening and closing dates and call logs.

10. A method for use with a data warehouse comprising:
    finding a next raw_key to use in order to link a fact table with a set of dimensions, the raw_key being associated with at least one of a new record and an updated record;
    bulk loading updated records into a raw table which serves as a temporary table, and stages the updated records to be at least one of inserted and bulk-loaded to final data warehouse tables, and preventing duplicate records;
    finding existing and new records in a primary key dimension from the set of dimensions;
    for each dimension in the data warehouse, except the primary key dimension:
        finding up-to-date records in said raw table;
        batch deleting all records that need to be changed from a map table; and
        bulk loading new records into that dimension table;
    finding all records to be loaded with correct raw_keys;
    for each dimension in the data warehouse, except the primary key dimension:
        batch loading into the map table; and
        batch deleting all non-linked records from the dimension table, including removing any dangling records from the dimension table, thereby updating the dimension table and removing any dangling values not associated with the primary key dimension; and
    populating said fact table and primary key dimension.

11. The method of claim 10 wherein said data warehouse has a snowflake schema.

12. The method of claim 10 wherein said data warehouse includes call center data.

13. The method of claim 12 wherein said primary keys are problem ticket identifiers.

14. The method of claim 10 wherein said bulk loading comprises relational database management system bulk loading.

15. The method of claim 10 wherein said dimension table comprises a set of attributes.

16. The method of claim 15 wherein said set of attributes includes at least one of the following attributes: agent, status, opening and closing times, opening and closing dates and call logs.

17. A method comprising:
  finding a next raw_key to use in a fact table in a database having a fact table and a set of dimensions, the raw_key linking the fact table to the set of dimensions, and being associated with at least one of a new record and an updated record each of said dimensions corresponding to a predetermined schema;
  bulk loading the updated records into a raw table which serves as a temporary table, and stages the updated records to be at least one of inserted and bulk-loaded to final data warehouse tables, and preventing duplicate records;
  finding existing and new records a given set of records to be updated and/or inserted as new records;
  for each dimension in the data warehouse, except the primary key dimension table:
    finding up-to-date records in said raw table;
    batch deleting all records that need to be changed from the dimension table, including removing any dangling records from the primary key dimension table, thereby updating the dimension table and removing any dangling values not associated with the primary key dimension;
    finding all records to load with correct raw_keys; and
    batch inserting said found records into the dimension table; and
  populating said fact table and primary key dimension.

18. The method of claim 17 wherein said predetermined schema is the newfact schema.

19. A computer program product comprising a non-transitory computer usable medium having a computer readable program, wherein said computer readable program when executed on a computer causes said computer to:
  identify a primary key for each fact entry in a data warehouse having a fact table and a set of dimensions, each of said dimensions corresponding to a predetermined schema;
  for each fact entry in the data warehouse, linking the fact table and the set of dimensions;
  for each said dimension, batch delete those records from its corresponding dimension table subject to an update, based on said primary key, including removing any dangling records from the corresponding dimension table, thereby updating the corresponding dimension table and removing any dangling values not associated with the corresponding dimension;
  for each said dimension, bulk load new records into its corresponding dimension table, based on said primary key; and
  bulk load said new records into said fact table, based on said primary key, wherein the bulk loading is via a temporary table, which stages updated records to be at least one of inserted and bulk-loaded to final data warehouse tables, and preventing duplicate records.

20. The computer program product of claim 19 wherein said data warehouse includes call center data and said primary keys are problem ticket identifiers.

* * * * *